(12) United States Patent
Xu (10) Patent No.: US 9,727,111 B2
(45) Date of Patent: Aug. 8, 2017

(54) CONTROL DEVICE FOR CURRENT SWITCHING AND ELECTRONIC DEVICE

(71) Applicant: Huawei Device Co., Ltd., Shenzhen (CN)

(72) Inventor: Shunhai Xu, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 404 days.

(21) Appl. No.: 14/301,959

(22) Filed: Jun. 11, 2014

(65) Prior Publication Data

US 2014/0310545 A1 Oct. 16, 2014

Related U.S. Application Data

(63) Continuation of application No. PCT/CN2013/076153, filed on May 23, 2013.

(30) Foreign Application Priority Data

May 28, 2012 (CN) .......................... 2012 1 0168980

(51) Int. Cl.
*G06F 1/26* (2006.01)
*G06F 1/28* (2006.01)
*H02J 7/00* (2006.01)

(52) U.S. Cl.
CPC ............... *G06F 1/28* (2013.01); *G06F 1/266* (2013.01); *H02J 7/0052* (2013.01); *H02J 2007/0062* (2013.01)

(58) Field of Classification Search
CPC ........ G06F 1/3202; G06F 1/3231; G06F 1/26; G06F 1/206; G06F 1/3228; G06F 1/08;

(Continued)

(56) References Cited

U.S. PATENT DOCUMENTS 5,715,465 A * 2/1998 Savage ..................... G06F 1/30
365/228
6,816,975 B1* 11/2004 Sasaki ..................... G06F 1/181
340/584

(Continued)

FOREIGN PATENT DOCUMENTS

CN 1509510 A 6/2004
CN 1838491 A 9/2006

(Continued)

OTHER PUBLICATIONS

Foreign Communication From a Counterpart Application, Chinese Application No. 201210168980.7, Chinese Office Action dated Mar. 4, 2015, 6 pages.

(Continued)

Primary Examiner — Zahid Choudhury
(74) Attorney, Agent, or Firm — Conley Rose, P.C.

(57) ABSTRACT

A control device for current switching includes: a universal serial bus on-the-go (USB OTG) interface for connecting to a first device; a universal serial bus (USB) interface for connecting to a second device; a booster current-limiting circuit connected between the USB OTG interface and the USB interface, where the booster current-limiting circuit, the USB OTG interface, and the USB interface form a line for the device to supply power to a device; and a measuring and controlling unit connected to the booster current-limiting circuit, where the measuring and controlling unit is configured to change, after a current switching request is received, a resistance value of a current-limiting circuit in the booster current-limiting circuit, so that the first device supplies a corresponding current to the second device. The control device for current switching and the electronic device can improve universality of the control device for current switching.

9 Claims, 3 Drawing Sheets

(58) Field of Classification Search
CPC ....... G06F 1/3289; G06F 1/266; H04L 12/12; H04L 12/10
See application file for complete search history.

(56) References Cited

U.S. PATENT DOCUMENTS

| | | | |
|---|---|---|---|
| 7,454,630 B1* | 11/2008 | Ong | G06F 1/266 713/300 |
| 2003/0030412 A1* | 2/2003 | Matsuda | G06F 1/263 320/127 |
| 2004/0063464 A1* | 4/2004 | Akram | H04W 52/0206 455/559 |
| 2004/0078505 A1* | 4/2004 | Yu | G06F 1/266 710/300 |
| 2004/0133716 A1 | 7/2004 | Lee | |
| 2006/0075152 A1* | 4/2006 | Zhu | G06F 13/4081 710/15 |
| 2006/0261788 A1 | 11/2006 | May | |
| 2007/0052393 A1 | 3/2007 | Okayama | |
| 2008/0265839 A1 | 10/2008 | Yang | |
| 2010/0064153 A1 | 3/2010 | Gk et al. | |
| 2010/0070659 A1 | 3/2010 | Ma et al. | |
| 2010/0235657 A1* | 9/2010 | Cho | G06F 1/263 713/300 |
| 2012/0246458 A1* | 9/2012 | Jain | G06F 1/3253 713/100 |
| 2013/0175977 A1* | 7/2013 | Tinaphong | H02J 7/0052 320/107 |
| 2015/0340898 A1* | 11/2015 | Schwartz | G06F 1/266 320/103 |

FOREIGN PATENT DOCUMENTS

| | | |
|---|---|---|
| CN | 101179199 A | 5/2008 |
| CN | 101901201 A | 12/2010 |
| CN | 102150143 A | 8/2011 |
| CN | 202153645 U | 2/2012 |
| EP | 2113983 A1 | 11/2009 |
| JP | 2000148390 A | 5/2000 |
| JP | 2003061256 A | 2/2003 |
| JP | 2004086647 A | 3/2004 |
| JP | 2005173937 A | 6/2005 |
| JP | 2007074866 A | 3/2007 |
| JP | 2010009208 A | 1/2010 |
| JP | 2011118768 A | 6/2011 |

OTHER PUBLICATIONS

Foreign Communication From a Counterpart Application, European Application No. 13797799.7, Extended European Search Report dated Feb. 9, 2015, 10 pages.
Partial English Translation and Abstract of Japanese Patent Application No. JPA2000148390, May 9, 2016, 26 pages.
Partial English Translation and Abstract of Japanese Patent Application No. JPA2011118768, May 9, 2016, 15 pages.
Foreign Communication From a Counterpart Application, Japanese Application No. 2014-549353, Japanese Rejection dated Mar. 22, 2016, 2 pages.
Foreign Communication From a Counterpart Application, Japanese Application No. 2014-549353, English Translation of Japanese Rejection dated Mar. 22, 2016, 2 pages.
Partial English Translation and Abstract of Japanese Patent Application No. JPA2003061256, Oct. 15, 2015, 42 pages.
Partial English Translation and Abstract of Japanese Patent Application No. JPA2004086647, Oct. 15, 2015, 30 pages.
Partial English Translation and Abstract of Japanese Patent Application No. JPA2005173937, Oct. 15, 2015, 54 pages.
Partial English Translation and Abstract of Japanese Patent Application No. JPA2007074866, Oct. 15, 2015, 33 pages.
Partial English Translation and Abstract of Japanese Patent Application No. JPA2010009208, Oct. 15, 2015, 28 pages.
Foreign Communication From a Counterpart Application, Japanese Application No. 2014-549353, Japanese Office Action dated Aug. 11, 2015, 5 pages.
Foreign Communication From a Counterpart Application, Japanese Application No. 2014-549353, English Translation of Japanese Office Action dated Aug. 11, 2015, 5 pages.
Partial English Translation and Abstract of Chinese Patent Application No. CN101179199A, Jul. 8, 2014, 23 pages.
Foreign Communication From a Counterpart Application, PCT Application No. PCT/CN2013/076153, English Translation of International Search Report dated Aug. 8, 2013, 3 pages.
Foreign Communication From a Counterpart Application, PCT Application No. PCT/CN2013/076153, Written Opinion dated Aug. 8, 2013, 5 pages.
"On-The-Go and Embedded Host Supplement to the USB Revision 2.0 Specification," Revision 2.0, May 8, 2009, 79 pages.

* cited by examiner

CONTROL DEVICE FOR CURRENT SWITCHING AND ELECTRONIC DEVICE

CROSS-REFERENCE TO RELATED APPLICATIONS

This application is a continuation of International Application No. PCT/CN2013/076153, filed on May 23, 2013, which claims priority to Chinese Patent Application No. 201210168980.7, filed on May 28, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of electronic and electrical technologies, and in particular, to a control device for current switching and an electronic device.

BACKGROUND

With the popularity of mobile terminals, in order to achieve an objective of implementing direct data exchange between electronic devices without using a computer, an on-the-go (OTG) protocol emerges as the times require. This technology can enable two electronic devices to communicate directly. For example, a digital camera may be connected to a universal serial bus (USB) interface of a printer to immediately print out a picture.

An electronic device supporting the OTG protocol generally includes a universal serial bus on-the-go (USB OTG) interface, a discharge circuit, and a charge circuit, where the discharge circuit may supply power to an external module (for example, Wireless Fidelity (Wi-Fi), a radio frequency, or the like) of the electronic device, and the charge circuit is used to charge the electronic device itself that supports the OTG protocol. Specifically, when a power source charges the electronic device, the power source supplies power to the electronic device that supports the OTG protocol after voltage step-down is performed by the charge circuit.

An electronic device supporting the OTG protocol is available in two types. A discharge circuit of the first type of electronic devices has a dedicated output chip, such as TPS61240/FAN4860, as the core, and a step-up circuit of the second type of electronic devices is a BOOST step-up circuit constructed by using a chip.

The inventor finds that these two types of devices in the prior art have at least the following disadvantages because the first type of electronic devices and the second type of electronic devices have different chips, causing the two types of devices to have different power supply modes, an electronic device that is powered by the first type of devices cannot be powered by the second type of electronic devices.

To sum up, an electronic device supporting the OTG protocol in the prior art has a disadvantage of poor universality, and cannot satisfy a requirement of various electronic products.

SUMMARY

In view of this, the present invention provides a control device for current switching and an electronic device, so as to address a problem of poor universality of an electronic device that supports an OTG protocol in the prior art.

To achieve the foregoing objective, the present invention provides the following technical solutions:

A control device for current switching includes: a USB OTG interface which is configured to connect to a first device and has a low level at an identifier (ID) pin; a USB interface which is configured to connect to a second device and has a high level at an ID pin; a booster current-limiting circuit connected between the USB OTG interface and the USB interface, where the booster current-limiting circuit, the USB OTG interface, and the USB interface form a line for the first device to supply power to the second device; and a measuring and controlling unit connected to the booster current-limiting circuit, where the measuring and controlling unit is configured to change, in a case that a current switching request is received, a resistance value of a current-limiting circuit in the booster current-limiting circuit, so that the first device supplies a corresponding current to the second device.

An electronic device includes: a charge circuit and a booster current-limiting circuit; an energy storage module connected separately to the charge circuit and the booster current-limiting circuit; a USB OTG interface configured to connect to a third device; a first control switch disposed between the charge circuit and the USB OTG interface, where the energy storage module, the charge circuit, the first control switch, and the USB OTG interface 101 form a line for an external power source to supply power to the electronic device; a second control switch disposed between the USB OTG interface and the booster current-limiting circuit, where the energy storage module, the booster current-limiting circuit, the second control switch, and the USB OTG interface form a line for the electronic device to supply power to the third device; and a measuring and controlling unit connected separately to a control end of the first control switch and a control end of the second control switch, where the measuring and controlling unit is connected to the booster current-limiting circuit, and the measuring and controlling unit is configured to detect whether an ID pin of the USB OTG interface is at a low level; if yes, control the first control switch to be off, the second control switch to be on, and change, after receiving a current switching request, a resistance value of a current-limiting circuit in the booster current-limiting circuit, so that the electronic device supplies a corresponding current to the third device; and if not, control the first control switch to be on and the second control switch to be off.

It can be known from the foregoing technical solution that, when the control device for current switching disclosed in embodiments of the present invention is used, a booster current-limiting circuit, a USB OTG interface, and a USB interface form a line for a first device to supply power to a second device, and the measuring and controlling unit changes, after receiving a current switching request, a current-limiting resistance value of the booster current-limiting circuit, which may achieve an objective of supplying multiple currents by the first device to the second device by using the control device for current switching. In other words, the control device for current switching may be connected to electronic devices that operate under different current values, thereby improving universality of the control device for current switching.

BRIEF DESCRIPTION OF THE DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

In the prior art, when two non-computer devices (where the two non-computer devices both support an OTG protocol) are connected, for example, a digital camera and a printer are connected, before the digital camera and the printer are connected, a USB interface of both the printer and the digital camera is configured to be in a slave device mode. Assume that the USB interface of the printer is connected to a USB OTG port of a cable supporting the OTG protocol, and the USB interface of the digital camera is connected to a common USB interface (non-USB OTG interface) of the cable, the printer detects whether an ID pin of the USB OTG interface of the cable is at a low level. If the ID pin is at the low level, the printer switches from the slave device mode to a master device mode; meanwhile, the printer starts to supply power to the digital camera. In this case, the digital camera is in the slave device mode. After a power supply line of the printer and the digital camera is established, the master and slave modes of the digital camera and the printer can be switched. If the digital camera needs to transfer data to the printer, the digital camera switches from the slave device mode to the master device mode. Correspondingly, the printer switches from the master device mode to the slave device mode. However, power supply is performed always by the printer to the digital camera. If the digital camera needs to supply power to the printer, it is required that the USB OTG interface of the digital camera is connected to the USB OTG port of the cable, and the printer is connected to the common USB interface of the cable. Because only the device connected to the USB OTG interface of the cable can be used as a power supplier, the device that needs to supply power should be connected to the USB OTG interface of the cable. If the printer detects that the ID pin of the USB OTG interface is at a high level, the printer can only be used as a slave device to connect to a computer by using the cable, and cannot supply power to another device by using the cable.

The power supply by the device supporting OTG to a peer device is implemented by using a discharge circuit. A discharge circuit includes a booster current-limiting circuit, where the booster current-limiting circuit includes a step-up circuit and a current-limiting circuit, the step-up circuit steps up battery voltage (3.4 volts (v) to 4.2 v) of an electronic device itself to 5 v, and the current-limiting circuit is an equivalent output resistance circuit of the electronic device and is used to limit a current output by the electronic device to be within a specific range. In the prior art, the device supporting the OTG protocol can supply only one current because a resistance value of the current-limiting circuit in the device supporting the OTG protocol is invariable.

Embodiment 1

Figure 1:
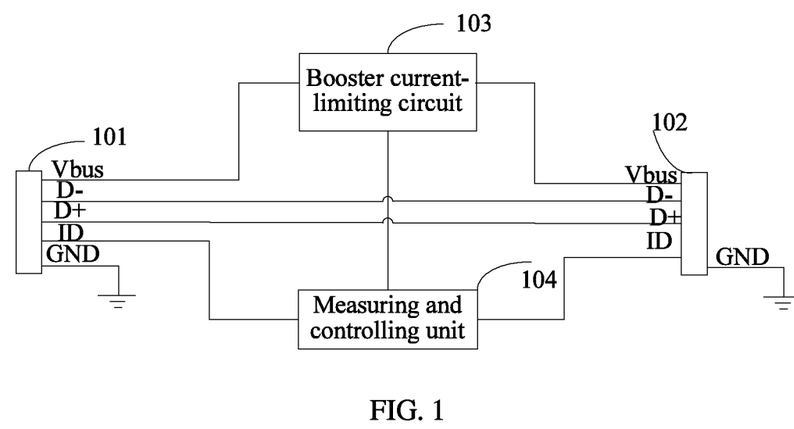
FIG. 1 is a schematic structural diagram of a first type of control device for current switching according to an embodiment of the present invention.

Referring to FIG. 1, which is a schematic structural diagram of a first control device for current switching disclosed in an embodiment of the present invention, the control device for current switching may include a USB OTG interface 101, a USB interface 102, a booster current-limiting circuit 103, and a measuring and controlling unit 104.

A connection relationship is as follows:

The USB OTG interface 101 is connected to a first device, where an ID pin of the USB OTG interface 101 is at a low level; the USB interface 102 (a non-USB OTG interface) is connected to a second device, where an ID pin of the USB interface 102 is at a high level; the booster current-limiting circuit 103 is connected between the USB OTG interface 101 and the USB interface 102, where the booster current-limiting circuit 103, the USB OTG interface 101, and the USB interface 102 form a line for the first device to supply power to the second device; and the measuring and controlling unit 104 is connected to the booster current-limiting circuit 103.

A universal USB interface (including the USB OTG interface 101 and the USB interface 102) has a Vbus pin, a D− pin, a D+ pin, a GND pin, and an ID pin.

A specific connection relationship is as follows: a step-up circuit in the booster current-limiting circuit 103 is connected separately to the Vbus pin in the USB OTG interface 101 and the Vbus pin of the USB interface 102; the measuring and controlling unit 104 is connected separately to the ID pin of the USB OTG interface 101 and the ID pin of the USB interface 102, where the measuring and controlling unit 104 controls a level of the ID pin of the USB OTG interface 101 to be a low level, and controls a level of the ID pin of the USB interface 102 to be a high level. Certainly, it is also allowed that the ID pin of the USB OTG interface 101 and the ID pin of the USB interface 102 are not connected to the measuring and controlling unit 104, where the ID pin in the USB OTG interface 101 is grounded, and the ID pin of the USB interface 102 is floated, which can also achieve an objective that the level of the ID pin of the USB OTG interface 101 is the low level and the level of the ID pin of the USB interface 102 is the high level.

Because the first device is connected to the USB OTG interface 101 of the control device for current switching, the first device supplies power to the second device. Because the first device has no booster current-limiting circuit therein, a value of a current supplied by the first device to the Vbus pin of the USB OTG interface 101 is smaller than a preset current value; therefore, the first device and the second device cannot communicate by using the control device for current switching, where the preset current value refers to a minimum value of the current supplied to the Vbus pin of the USB OTG interface 101 for the first device to communicate with the second device by using the control device for current switching.

Because the first device and the second device cannot communicate by using the control device for current switching, the D− pin of the USB OTG interface 101, the D− pin of the USB interface 102, the D+ pin of the USB OTG interface 101, and the D+ pin of the USB interface 102 may be floated, or the D− pin of the USB OTG interface 101 is connected to the D− pin of the USB interface 102, and the D+ pin of the USB OTG interface 101 is connected to the D+ pin of the USB interface 102.

The measuring and controlling unit 104 may be a circuit having a corresponding function, or a chip having a corresponding function.

An operating process of the measuring and controlling unit 104 is as follows:

The measuring and controlling unit 104 is configured to change, in a case that a current switching request is received, a resistance value of a current-limiting circuit in the booster current-limiting circuit 103, so that the first device supplies a corresponding current to the second device.

Specifically, the measuring and controlling unit 104 may be connected to the current-limiting circuit in the booster current-limiting circuit 103 by using a bus extender, and the measuring and controlling unit 104 may change the resistance value of the current-limiting circuit in the booster current-limiting circuit 103 by controlling a pin state of the bus extender.

Certainly, the measuring and controlling unit 104 may also be connected to the current-limiting circuit in the booster current-limiting circuit 103 by using a general-purpose input/output interface (GPIO), and the measuring and controlling unit 104 may change the resistance value of the current-limiting circuit in the booster current-limiting circuit 103 by controlling a pin state of the GPIO.

In the following, the bus extender, the GPIO, and a device having a similar function are collectively referred to as a versatile interface.

The booster current-limiting circuit 103 in the embodiment of the present invention may have multiple specific implementation manners. For example, the booster current-limiting circuit 103 may include a step-up circuit, a resistor R1, and a resistor R2, where the step-up circuit is connected separately to a first end of the resistor R1 and a first end of the resistor R2, a second end of the resistor R2 is grounded, and a second end of the resistor R1 is connected to a pinout A of a versatile interface. The resistor R1 and the resistor R2 form a current-limiting circuit.

Based on the foregoing structure of the booster current-limiting circuit 103, a process in which the measuring and controlling unit 104 changes the resistance value of the current-limiting circuit in the booster current-limiting circuit 103 by controlling the pin state of the versatile interface is as follows:

When the measuring and controlling unit 104 receives a request for the first device to supply a first current to the second device, the measuring and controlling unit 104 controls the pinout A of the versatile interface to be a high level; and when receiving a request for the first device to supply a second current to the second device, controls the pinout A of the versatile interface to be a low level.

When the pinout A of the versatile interface is at the low level, the resistor R1 and the resistor R2 are in parallel, and the resistance value of the current-limiting circuit of the booster current-limiting circuit 103 decreases. In this case, the first device supplies a large current, that is, the second current, to the second device. When the pinout A of the versatile interface is at the high level, the resistor R1 is not connected to the current-limiting circuit of the booster current-limiting circuit 103. In this case, the resistance value of the booster current-limiting circuit 103 increases, so that the first device supplies a small current, that is, the first current, to the second device.

In an actual application, after the first device is connected to the second device by using the control device for current switching and before the current switching request is received, the first device has started to supply power to the second device. The current that is supplied by the first device to the second device in this case is referred to as an initial current. In order to ensure that the initial current is smaller than a maximum rated current of the second device, preferably, the initial current that is supplied by the first device to the second device by using the control device for current switching is the first current. That is, the measuring and controlling unit 104 controls the pinout A of the versatile interface to be the high level; hence, the current supplied by the first device to the second device by using the control device for current switching is small, that is, the first current. If the first current cannot satisfy a requirement of the second device, the control device for current switching performs current switching according to the current switching request.

The current switching request is determined manually according to a requirement, where a specific process is as follows:

The control device for current switching may include a physical key, where the physical key is connected to the measuring and controlling unit 104, and the measuring and controlling unit 104 changes, after receiving a signal indicating that the physical key is pressed, the resistance value of the current-limiting circuit in the booster current-limiting circuit 103, so that the first device supplies a corresponding current to the second device.

Specifically, the measuring and controlling unit 104 detects the number of times that the physical key is pressed within a preset duration; if the number of times is 1, the measuring and controlling unit 104 controls the resistance value of the current-limiting circuit in the booster current-limiting circuit 103 so that the first device supplies the first current to the second device; and if the number of times is 2, the measuring and controlling unit 104 controls the resistance value of the current-limiting circuit in the booster current-limiting circuit 103 so that the first device supplies the second current to the second device.

If the first device can supply N currents to the second device by using the control device for current switching, and if the physical key is pressed N times within the preset duration, the measuring and controlling unit 104 controls the resistance value of the current-limiting circuit in the booster current-limiting circuit 103, so that the first device supplies an Nth current to the second device, where N is greater than or equal to 2, and N is a positive integer.

The one that is located inside the control device for current switching and can generate a current switching request is not necessarily the physical key, and may also be a toggle switch, where the toggle switch is connected to the measuring and controlling unit 104. The measuring and controlling unit 104 controls, after receiving a signal indicating that a position of the toggle switch changes from up to down or from left to right, the resistance value of the booster current-limiting circuit 103, so that the first device supplies a corresponding current to the second device.

Specifically, when the toggle switch changes the position from up to down, the measuring and controlling unit 104 generates a request for the first device to supply the first current to the second device; after the toggle switch changes the position from up to down, the measuring and controlling unit 104 controls the pinout A of the versatile interface to be the high level. In this case, because the resistance value of the booster current-limiting circuit 103 increases, the first device supplies a small current, that is, the first current, to the second device. After the toggle switch changes the position from left to right, the measuring and controlling unit 104 generates a request for the first device to supply the second current to the second device. In this case, the measuring and controlling unit 104 controls the pinout A of the versatile interface to be the low level. In this case, because the resistance value of the booster current-limiting circuit 103 decreases, the first device supplies a large current, that is, the second current, to the second device. Preferably, the second current can enable the second device to operate normally, and can charge a battery in the second device.

The control device for current switching may further include a touchscreen, where the touchscreen is connected to the measuring and controlling unit 104. The touchscreen has multiple options (for example, supplying the first current by the first device to the second device) for a user to select, where a different selection triggers a different command, and the measuring and controlling unit 104 may perform a corresponding operation according to a corresponding command.

In the foregoing embodiment, the first device can supply two currents to the second device by using the control device for current switching. When the first device is required to supply three or more currents to the second device by using the control device for current switching, it is only required to modify the current-limiting circuit in the booster current-limiting circuit 103.

Figure 2:
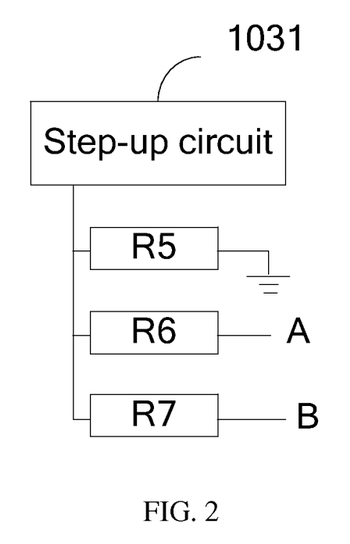
FIG. 2 is a circuit diagram of a booster current-limiting circuit according to an embodiment of the present invention.

For example, when the first device can supply three currents to the second device by using the control device for current switching, as shown in FIG. 2, the booster current-limiting circuit 103 may include a step-up circuit 1031, a resistor R5, a resistor R6, and a resistor R7, where the step-up circuit 1031 is connected separately to a first end of the resistor R5, a first end of the resistor R6, and a first end of the resistor R7; a second end of the resistor R5 is grounded; a second end of the resistor R6 is connected to the pinout A of the versatile interface; and a second end of the resistor R7 is connected to a pinout B of the versatile interface. In this case, the first device can supply three different currents to the second device by using the control device for current switching. Specifically, when the second device needs a small current, the measuring and controlling unit 104 controls the pinout A and the pinout B of the versatile interface both to be a high level; when the second device needs a medium current, the measuring and controlling unit 104 controls the pinout A of the versatile interface to be a low level and controls the pinout B to be a high level, or the measuring and controlling unit 104 controls the pinout A of the versatile interface to be a high level and controls the pinout B to be a low level; and when the second device needs a large current, the measuring and controlling unit 104 controls the pinout A and the pinout B of the versatile interface both to be a low level. The resistor R5, the resistor R6, and the resistor R7 form a current-limiting circuit.

The first device can supply as many currents to the second device by using the control device for current switching as the number of resistors that form the current-limiting circuit in the booster current-limiting circuit 103, which does not affect the implementation of the present invention. Therefore, no specific limit is set to composition of the current-limiting circuit in the booster current-limiting circuit 103.

The control device for current switching may further include an organic light-emitting diode display screen, where the organic light-emitting diode display screen is connected to the measuring and controlling unit 104, and is configured to display a power supply mode of the control device for current switching.

Specifically, the measuring and controlling unit 104 controls, after receiving the request for the first device to supply the first current to the second device, the organic light-emitting diode display screen to display "in a first power supply mode". When the measuring and controlling unit 104 receives no request for the first device to supply power to the second device, the measuring and controlling unit 104 controls the organic light-emitting diode display screen to display "in a second power supply mode". If the first device can supply N currents to the second device by using the control device for current switching, correspondingly, a power supply mode of the control device for current switching has N power supply modes, where N is greater than or equal to 2, and N is a positive integer.

When the control device for current switching disclosed in the embodiment of the present invention is used, the booster current-limiting circuit 103, the USB OTG interface 101, and the USB interface 102 form the line for the first device to supply power to the second device, and the measuring and controlling circuit 104 changes, after receiving the current switching request, a resistance value of the current-limiting circuit in the booster current-limiting circuit 103, which may achieve an objective of supplying multiple currents by the first device to the second device by using the control device for current switching. In other words, the first device may be, by using the control device for current switching, connected to electronic devices that operate under different current values, thereby improving universality of the electronic device.

Embodiment 2

Figure 3:
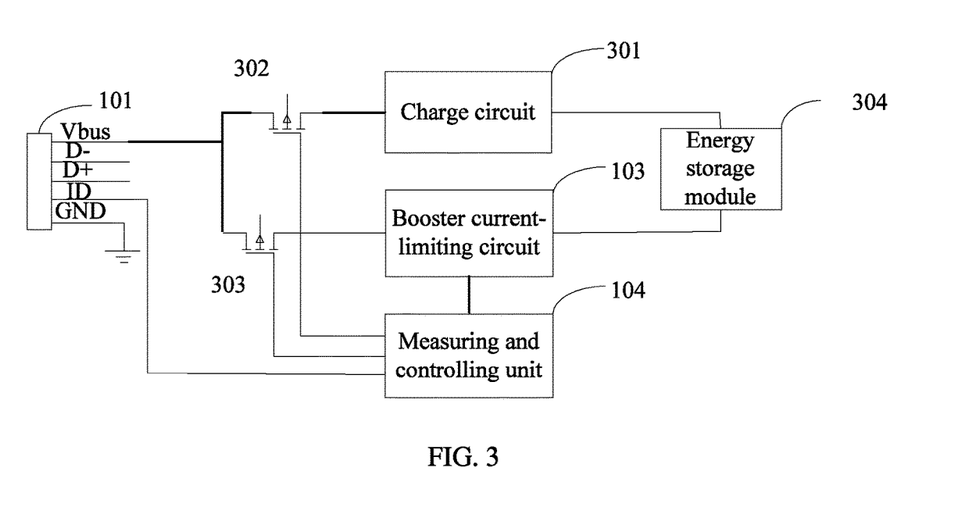
FIG. 3 is a schematic structural diagram of a second type of control device for current switching according to an embodiment of the present invention.

Referring to FIG. 3, which is a schematic structural diagram of an electronic device provided by an embodiment of the present invention, the electronic device (in order to distinguish the electronic device from other electronic devices, the electronic device is referred to as an electronic device A) includes a USB OTG interface 101, a booster current-limiting circuit 103, a measuring and controlling unit 104, a charge circuit 301, a first control switch 302, a second control switch 303, and an energy storage module 304.

A connection relationship is as follows:

The USB OTG interface 101 is connected to a third device. The measuring and controlling unit 104 is connected separately to the USB OTG interface 101 and the booster current-limiting circuit 103; the first control switch 302 is disposed between the charge circuit 301 and the USB OTG interface 101; the charge circuit 301 is connected to the energy storage module 304, where the energy storage module 304, the charge circuit 301, the first control switch 302, and the USB OTG interface 101 form a line for an external power source to supply power to the electronic device A. The second control switch 303 is disposed between the booster current-limiting circuit 103 and the USB OTG interface 101, and the booster current-limiting circuit 103 is connected to the energy storage module 304, where the energy storage module 304, the booster current-limiting circuit 103, the second control switch 303, and the USB OTG interface 101 form a line for the electronic device A to supply power to the third device. The measuring and controlling unit 104 is connected separately to a control end of the first control switch 302 and a control end of the second control switch 303.

The energy storage module 304 may be a battery.

A connection relationship between a pin of the USB OTG interface 101 and each circuit is specifically as follows: a Vbus pin of the USB OTG interface 101 is connected separately to one end of the first control switch 302 and one end of the second control switch 303; an ID pin of the USB OTG interface 101 is connected to the measuring and controlling unit 104; a D+ pin and a D− pin of the USB OTG interface 101 are connected to a USB enumerating module in the electronic device A.

An operating process of the measuring and controlling unit 104 is as follows:

The measuring and controlling unit 104 is configured to detect whether the ID pin of the USB OTG interface 101 is at a low level; if yes, control the first control switch 302 to be off and the second control switch 303 to be on; and if not, control the first control switch 302 to be on and the second control switch 303 to be off.

If the ID pin of the USB OTG interface 101 is at the low level, the electronic device A switches from a slave device mode into a master device mode, and supplies electrical energy in the energy storage module 304 to the third device by using the booster current-limiting circuit 103. That is, the electronic device A supplies a current to the third device. In a process of supplying power to the third device, if the measuring and controlling unit 104 receives a current switching request, the measuring and controlling unit 104 changes a resistance value of a current-limiting circuit in the booster current-limiting circuit 103, so that the electronic device A supplies a corresponding current to the third device. If the measuring and controlling unit 104 detects that the ID pin of the USB OTG interface 101 is at a high level, the electronic device A can be connected only to a device having a computer function to download information from the computer or transfer information thereof to the computer. After the electronic device A is connected to the computer, only the computer can supply a current to the electronic device A, and the electronic device A is always in the slave device mode. Because the electronic device A does not need to supply power to an external device, the second control switch 303 is off; and because the computer supplies a current to the electronic device A and charges the energy storage module 304 in the electronic device A, the first control switch 302 is on.

A difference between this embodiment and Embodiment 1 lies in that, because the electronic device A in this embodiment of the present invention has the booster current-limiting circuit 103, a value of a current supplied to the Vbus pin of the USB OTG interface 101 can reach a preset current value, thereby satisfying a condition for the electronic device A to communicate with the third device, so that the electronic device A and the third device can communicate.

The booster current-limiting circuit 103 may include a step-up circuit, a resistor R1, and a resistor R2, where the step-up circuit is connected separately to a first end of the resistor R1 and a first end of the resistor R2, a second end of the resistor R2 is grounded, and a second end of the resistor R1 is connected to a pinout A of a versatile interface. The resistor R1 and the resistor R2 form a current-limiting circuit.

Based on the structure of the booster current-limiting circuit 103, a process of changing the resistance value of the booster current-limiting circuit 103 by controlling a pin state of a versatile interface is as follows:

After the electronic device A is connected to the third device, the measuring and controlling unit 104 controls the pinout A of the versatile interface to be a high level, so that the electronic device A supplies a fourth current to the third device; in a case that it is detected that the electronic device A needs to communicate with the third device, the measuring and controlling unit 104 controls the pinout A of the versatile interface to be a low level, so that the electronic device A supplies a fifth current to the third device.

When the pinout A of the versatile interface is at the low level, the resistor R1 and the resistor R2 are in parallel, and a resistance value of the current-limiting circuit of the booster current-limiting circuit 103 decreases. In this case, the electronic device A supplies a large current, that is, the fifth current, to the third device. When the pinout A of the versatile interface is at the high level, the resistor R1 is not connected to the current-limiting circuit of the booster current-limiting circuit 103. In this case, the resistance value of the booster current-limiting circuit 103 increases, so that the electronic device A supplies a small current, that is, the fourth current, to the third device.

A process of switching from the fourth current to the fifth current requires no human intervention because the electronic device A can detect, by using a USB enumerating method, whether the third device needs to communicate with the electronic device A, where the operation does not need to be triggered manually. Specifically, the USB enumerating module in the electronic device A may detect the D+ and D− pins of the USB OTG interface 101 to determine whether the electronic device A needs to communicate with the third device, which belongs to the prior art and is not described herein.

In an actual application, after the electronic device A is connected to the third device and before a current switching command is received, the electronic device A has started to supply power to the third device. A current that is supplied by the electronic device A to the third device in this case is referred to as an initial current. In order to ensure that the initial current is smaller than a maximum rated current of the third device, preferably, the initial current that is supplied by the electronic device A to the third device is the fourth current. That is, the default initial current of the electronic device A is the fourth current. That is, the measuring and controlling unit 104 controls the pinout A of the versatile interface to be the high level.

The electronic device A in the foregoing embodiment can supply two currents to the third device. If the electronic device A is required to supply three or more currents to the third device, it is only required to modify the current-limiting circuit in the booster current-limiting circuit 103.

In an example where an electronic device A can supply three currents to a third device, the booster current-limiting circuit 103 may further include a step-up circuit, a resistor R5, a resistor R6, and a resistor R7, where the step-up circuit is connected separately to a first end of the resistor R5, a first end of the resistor R6, and a first end of the resistor R7; a second end of the resistor R5 is grounded; a second end of the resistor R6 is connected to the pinout A of the versatile interface; and a second end of the resistor R7 is connected to a pinout B of the versatile interface.

After the electronic device A is connected to the third device and before the electronic device A receives a current switching command, the electronic device A has started to supply a current to the third device. In order to ensure that the initial current supplied by the electronic device A is smaller than a maximum rated current of the third device, the initial current that is supplied by the electronic device A to the third device is a seventh current. That is, the measuring and controlling unit 104 controls the pinout A and the pinout B of the versatile interface both to be a high level. In a case that the electronic device A needs to communicate with the third device, the measuring and controlling unit 104 in the electronic device A automatically controls the pinout A of the bus extender to be a low level and the pinout B to be the high level, or controls the pinout A to be the high level and the pinout B to be the low level; hence, the electronic device A supplies a large current, that is, an eighth current, to the third device. When the electronic device does not need to communicate with the third device, and the seventh current cannot satisfy a requirement of the third device, manual selection is performed so that the electronic device A supplies a ninth current to the third device. The measuring and controlling unit 104 controls, after receiving a request for supplying the ninth current to the third device, the pinout A and the pinout B of the versatile interface both to be the low level. Certainly, according to a different actual requirement, the initial current that is supplied by the electronic device A to the third device may also be the ninth current.

The current switching request is determined manually according to a requirement, which is specifically the same as the method for generating the current switching request in Embodiment 1, and is not described repeatedly herein.

In the embodiment of the present invention, because the booster current-limiting circuit 103, the USB OTG interface 101, the booster current-limiting circuit 103, and the energy storage module 304 form the line for the electronic device A to supply power to the third device, and the measuring and controlling unit 104 changes, after receiving the current switching request, the resistance value of the current-limiting circuit in the booster current-limiting circuit 103, which may achieve an objective for the electronic device A to supply multiple currents to the third device. In other words, the electronic device A may be connected to electronic devices that operate under different current values, thereby improving universality of the electronic device A.

Each embodiment in this specification is described in a progressive manner. The focus of the description in each embodiment is the difference from another embodiment; for the identical or similar parts of the embodiments, reference may be made to each other. The apparatus disclosed in the embodiments is simply described because the apparatus corresponds to the method disclosed in the embodiments. For a related part, reference may be made to the description of the method.

It should also be noted that in this specification, a relationship term such as first and second is merely used to distinguish one entity or operation from another entity or operation, and does not necessarily require or imply that any actual relationship or sequence exists between these entities or operations. Moreover, the terms "include", "comprise", or their any other variation is intended to cover a non-exclusive inclusion, so that a process, a method, an article, or a device that includes a list of elements is not necessarily limited only to those elements, but may include other elements which are not expressly listed, or further includes elements inherent to such process, method, article, or device. An element proceeded by "including one . . . " does not, without more constraints, preclude the existence of additional identical elements in the process, method, article, or device that includes the element.

The steps of the methods or algorithms that are described in the embodiments disclosed herein may be directly implemented by hardware, a software module executed by a processor, or the combination of the two. The software module may be placed in a random access memory (RAM), a memory, a read-only memory (ROM), an electrically programmable ROM, an electrically erasable programmable ROM, a register, a hard disk, a removable magnetic disk, a compact disc read-only memory (CD-ROM), or any storage medium of other forms well-known in the art.

The foregoing description of the embodiments disclosed can enable a person skilled in the art to implement or use the present invention. It is obvious for a person skilled in the art that multiple modifications may be made to these embodiments. The general principle defined herein can be implemented in other embodiments without departing from the spirit or scope of the present invention. Therefore, the present invention is not limited to these embodiments described herein, and shall be granted with a maximum scope that is consistent with the principles and new features that are disclosed in the present invention.

What is claimed is:

1. A control device for current switching, comprising:
a universal serial bus on-the-go (USB OTG) interface comprising a low level at an identifier (ID) pin, wherein the USB OTG interface is configured to connect to a first device;
a universal serial bus (USB) interface comprising a high level at an ID pin, wherein the USB interface is configured to connect to a second device;
a booster current-limiting circuit comprising:
a step-up circuit;
a resistor R1; and
a resistor R2,
wherein the step-up circuit is connected separately to a first end of the resistor R1 and a first end of the resistor R2,
wherein a second end of the resistor R2 is grounded, and wherein a second end of the resistor R1 is connected to a pinout A of a bus extender,
wherein the booster limiting circuit is disposed between the USB OTG interface and the USB interface, and
wherein the booster current-limiting circuit, the USB OTG interface, and the USB interface form a line for the first device to supply power to the second device; and
a measuring and controlling unit connected to the booster current-limiting circuit, wherein the measuring and controlling unit is configured to change a resistance value of a current-limiting circuit in the booster current-limiting circuit such that the first device supplies a corresponding current to the second device.

2. The device according to claim 1, wherein the measuring and controlling unit is further configured to:
control the pinout A of the bus extender to be a high level when receiving a request for the first device to supply a first current to the second device; and
control the pinout A of the bus extender to be a low level when receiving a request for the first device to supply a second current to the second device.

3. The device according to claim 2, further comprising a physical key connected to the measuring and controlling unit, configured to generate, after receiving a signal indicating that the physical key is pressed, a request for the first device to supply a corresponding current to the second device.

4. The device according to claim 2, wherein an initial current is the first current, and the initial current is a current supplied by the first device to the second device after the first device is connected to the second device by using the control device for current switching and before the measuring and controlling unit receives the current switching request.

5. The device according to claim 1, further comprising an organ ic light-emitting diode display screen connected to the measuring and controlling unit, configured to display a power supply mode of the control device for current switching.

6. An electronic device, comprising:
   a charge circuit;
   a booster current-limiting circuit comprising:
      a step-up circuit;
      a resistor R5;
      a resistor R6; and
      a resistor R7,
      wherein the step-up circuit is connected separately to a first end of the resistor R5, a first end of the resistor R6, and a first end of the resistor R7,
      wherein a second end of the resistor R5 is grounded,
      wherein a second end of the resistor R6 is connected to a pinout A of a bus extender, and
      wherein a second end of the resistor R7 is connected to a pinout B of the bus extender,
   an energy storage module connected separately to the charge circuit and the booster current-limiting circuit;
   a universal serial bus on-the-go (USB OTG) interface configured to connect to a second device;
   a first control switch disposed between the charge circuit and the USB OTG interface, wherein the energy storage module, the charge circuit, the first control switch, and the USB OTG interface form a line for an external power source to supply power to the electronic device;
   a second control switch disposed between the USB OTG interface and the booster current-limiting circuit, wherein the energy storage module, the booster current-limiting circuit, the second control switch, and the USB OTG interface form a line for the electronic device to supply power to the second device; and
   a measuring and controlling unit connected separately to a control end of the first control switch and a control end of the second control switch, wherein the measuring and controlling unit is connected to the booster current-limiting circuit, and the measuring and controlling unit is configured to:
      detect whether an identifier (ID) pin of the USB OTG interface is at a low level;
      control the first control switch to be off, the second control switch to be on, and change, after receiving a current switching request, a resistance value of a current-limiting circuit in the booster current-limiting circuit such that the electronic device supplies a corresponding current to the second device when the ID pin of the USB OTG interface is at the low level; and
      control the first control switch to be on and the second control switch to be off when the ID pin of the USB OTG interface is not at the low level.

7. The device according to claim 6, wherein the measuring and controlling unit is configured to:
   control the pinout A and the pinout B of the bus extender both to be a high level when receiving a request for the electronic device to supply a first current to the second device;
   control the pinout A of the bus extender to be a low level and the pinout B to be a high level; and
   control the pinout A and the pinout B of the bus extender both to be a low level when detecting a request for the electronic device to supply a second current to the second device.

8. The device according to claim 6, further comprising a physical key connected to the measuring and controlling unit, configured to generate, after receiving a signal indicating that the physical key is pressed, a request for the electronic device to supply a corresponding current to the second device.

9. The device according to claim 6, wherein the measuring and controlling unit is configured to:
   control the pinout A and the pinout B of the bus extender both to be a high level when receiving a request for the electronic device to supply a first current to the second device;
   control the pinout A to be a high level and the pinout B to be a low level when detecting that the electronic device needs to communicate with the second device; and
   control the pinout A and the pinout B of the bus extender both to be a low level when detecting a request for the electronic device to supply a second current to the second device.

* * * * *

UNITED STATES PATENT AND TRADEMARK OFFICE
CERTIFICATE OF CORRECTION

PATENT NO. : 9,727,111 B2  
APPLICATION NO. : 14/301959  
DATED : August 8, 2017  
INVENTOR(S) : Shunhai Xu Page 1 of 1

It is certified that error appears in the above-identified patent and that said Letters Patent is hereby corrected as shown below:

In the Claims

Column 13, Line 4, Claim 5 should read:  
organic light-emitting diode display screen connected to the Signed and Sealed this  
Seventeenth Day of October, 2017

Joseph Matal  
*Performing the Functions and Duties of the*  
*Under Secretary of Commerce for Intellectual Property and*  
*Director of the United States Patent and Trademark Office*